United States Patent [19]

Kaplinsky et al.

[11] Patent Number: 4,885,595

[45] Date of Patent: Dec. 5, 1989

[54] MULTICOMPONENT REFILLABLE TONER DELIVERY SYSTEM

[75] Inventors: George Kaplinsky; Ross R. Allen, both of San Diego, Calif.

[73] Assignee: Hewlett-Packard Company, Palo Alto, Calif.

[21] Appl. No.: 311,017

[22] Filed: Feb. 14, 1989

[51] Int. Cl.[4] .............................................. G01G 15/18

[52] U.S. Cl. .................................... 346/140 R; 346/75

[58] Field of Search ................. 346/75, 140 R, 140 IJ, 346/140 PD

[56] References Cited

U.S. PATENT DOCUMENTS 4,590,494 5/1986 Ichihashi et al. ............... 346/140 R 4,714,937 12/1987 Kaplinsky ....................... 346/140 R

*Primary Examiner*—George H. Miller, Jr.

*Attorney, Agent, or Firm*—Roland I. Griffin

[57] ABSTRACT

A liquid delivery system for delivering inks of three or more different colors or densities or dye-forming reactive components comprising multiple liquid reservoirs, liquid bladders, and valves that permit (a) total interruption of liquid flow, (b) liquid flow from reservoirs to bladders and (c) flow of liquid from bladders to printhead, the latter adapted to handle toners of three different colors, optical densities or chemical composition. The valves and ink flow channels are arranged in an upper manifold, gasket and lower manifold, all of which serve as support for the bladders and dimpler system.

12 Claims, 4 Drawing Sheets

Fig. 1.
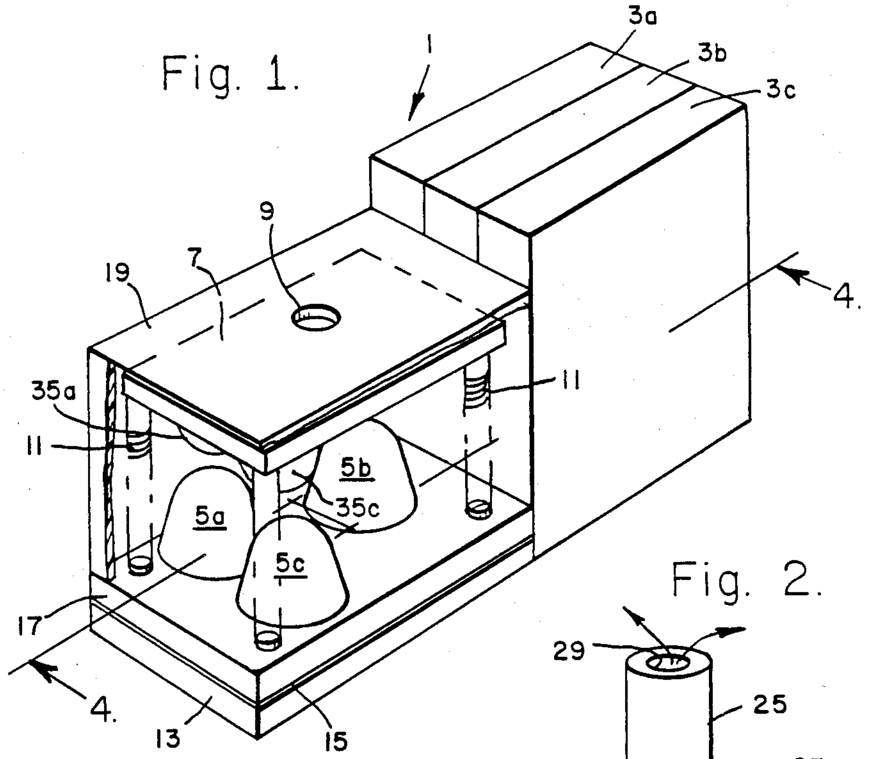
Fig. 2.
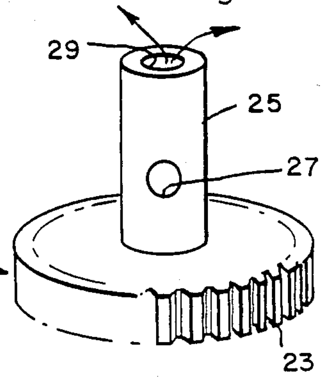
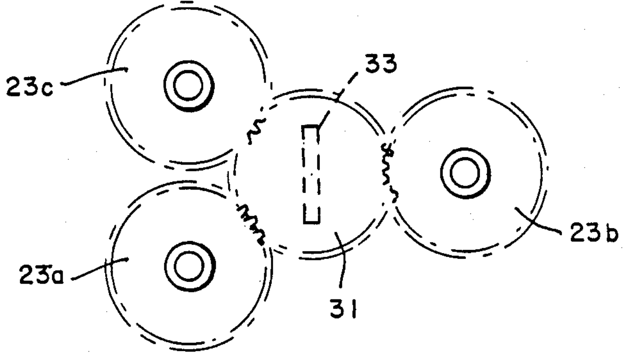
Fig. 3.

MULTICOMPONENT REFILLABLE TONER DELIVERY SYSTEM

RELATED PATENT

This invention is an improvement on the ink delivery system described and claimed in U.S. Pat. No. 4,714,937, entitled Ink Delivery System, inventor George T. Kaplinsky, one of the inventors herein.

TECHNICAL FIELD

This invention relates to ink-jet printers, and, more particularly, to a printer head with associated means for delivering a multicolor or multicomponent toner supply; the delivering means are refillable.

BACKGROUND ART

In U.S. Pat. No. 4,714,937, various prior art ink delivery systems are described as well as some of the problems associated therewith. The patent describes a new system which is designed to overcome prior art problems. The new patented system comprises a toner bag, a print head, a bladder for delivering toner to the print head at a controlled pressure, a valve for controlling the flow of toner from the bag to bladder and separately from the bladder to the print head.

DISCLOSURE OF THE INVENTION

It is an advantage of the present invention that it provides a toner delivery system that is capable of delivering toners of different colors, toners of the same color but different optical densities, or two or more components which will react when over-printed on a printing medium to develop alphanumeric symbols or color.

It is a further advantage in that it provides a system that is capable of printing a wide range of colors.

It is still another advantage in that it also provides a system that is easy to manufacture and capable of delivering a steady supply of toner with a minimum of supervision.

The delivery system of the present invention can be used with a number of different liquids, as noted above. It will now be described and illustrated in the Figs. as a system for delivering three liquid components, in this case different colored inks. If a system for delivering two, four, five, or more liquids is desired, the corresponding number of ink bags, bladders, valves, inlet grooves, outlet grooves, etc. will be used. In addition, inks of the same color but different optical densities, or separate components that will react and develop on the print medium can be substituted.

Accordingly, a tricolor ink delivery system, having refillable bladders is described. The tricolor ink delivery system comprises:

(a) three ink bags or reservoirs for storing quantities of different colored inks;

(b) a printhead capable of delivering inks of at least three different colors to a printing medium;

(c) three bladders for providing a supply of ink of a selected color from each of the bladders to predetermined nozzles in a print head;

(d) a valve associated with each bladder for providing a closed mode, a refill mode for conveying ink from a reservoir to the bladder, and a print mode for conveying ink from the bladder to the printhead; and (e) support means for maintaining the reservoir, the printhead, the bladders and the valves in cooperative association.

BRIEF DESCRIPTION OF THE DRAWINGS

FIG. 1 is a perspective view of the ink delivery system of the present invention, excluding the printhead;

FIG. 2 is a side elevation view of a valve which may be used in this invention;

FIG. 3 is a top plan view showing the relation of the rotating means and the three valves;

BEST MODES FOR CARRYING OUT THE INVENTION

Figure 4:
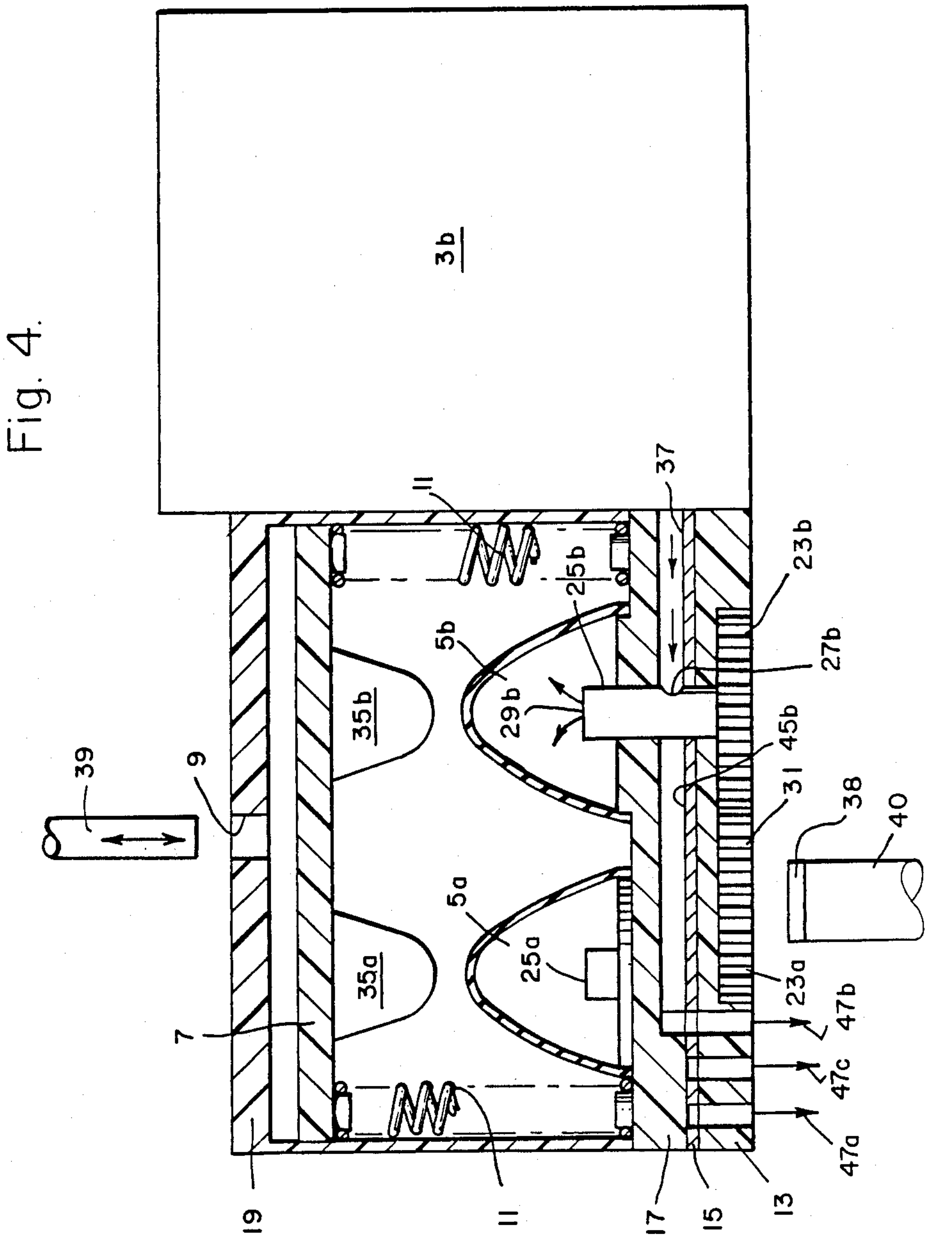
FIG. 4 is a side elevation view taken along the line 4—4 in FIG. 1.
Figure 5:
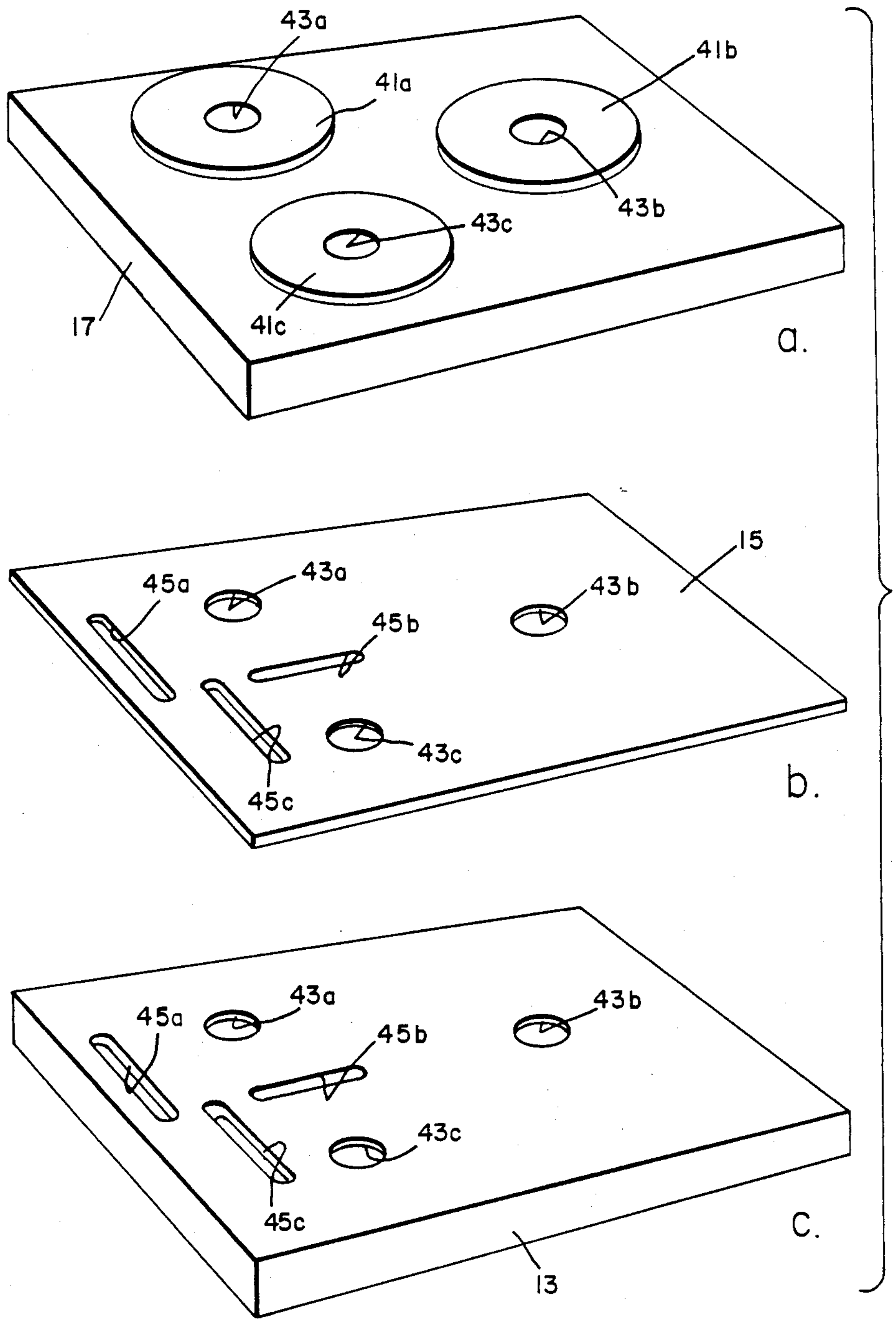
FIG. 5 is an exploded top perspective view of an upper manifold, gasket, and lower manifold.

Referring to the drawings wherein like numerals of reference designate like elements throughout, a system for delivering ink to an ink-jet print head is shown generally at 1. It comprises generally three ink reservoirs **3*a*, 3*b* and 3*c*, which can be detachably secured to housing 19. Within housing 19 are three bladders 5*a*, 5*b*, and 5*c*, which are mounted on a three layer platform comprising top manifold 17, gasket 15, and lower manifold 13. Near the top of housing 19 is dimpler system 7, which is supported by resilient supports 11. On the top of housing 19 is dimpler access hole 9. Bladders 5*a*, 5*b* and 5*c*** are preferably molded from elastomeric material.

Bladders **5*a*, 5*b* and 5*c* are each provided with a valve such as valve 21, illustrated in FIGS. 2 and 4. Valve 21 has a molded gear 23 at the base, a vertical flow pipe 25, inlet port 27, and outlet port 29**.

FIG. 3 illustrates how the three gears **23*a*, 23*b* and 23*c*, mesh with rotating means (sun gear) 31**.

FIG. 4 is a side elevational view of the ink delivery system 1 taken on the line 4—4 in FIG. 1. Ink from reservoir **3*b* flows through inlet groove 37*b* located in the bottom of upper manifold 17 through inlet port 27*b*, then up through vertical flow pipe 25*b*, and into bladder 5*b* through outlet 29*b*. By rotating sun gear 31 90°, the flow of ink can be stopped because valve 21*b* is rotated as well. When sun gear 31 is rotated an additional 90°, thus again rotating valve 21*b*, outlet port 27*b* is aligned with outlet groove 45*b* in the bottom surface of upper manifold 17. After passing through outlet grooves 45*a*, 45*b* and 45*c* in gasket 15, the ink flows through outlet ports 47*a*, 47*b* and 47*c* to a printhead (not shown). In bottom manifold 13, gears 23*a*, 23*b* and 23*c* are positioned around sun gear 31, as illustrated in FIG. 4. Flow pipes 25*a*, 25*b* and 25*c* extend through holes 43*a*, 43*b* and 43*c* in manifolds 13 and 17 and gasket 15**.

Figure 6:
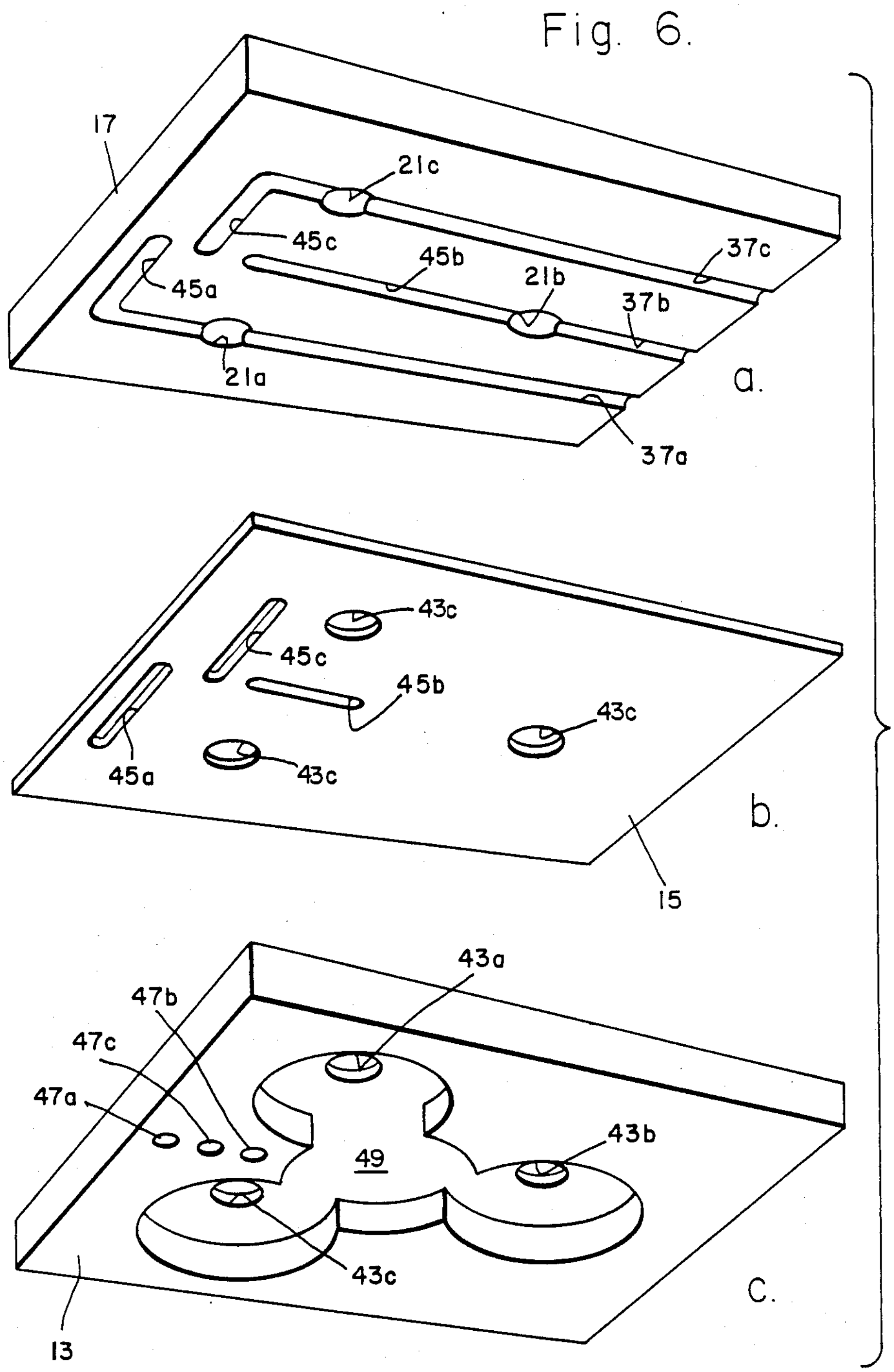
FIG. 6 is an exploded bottom perspective view of an upper manifold, gasket, and lower manifold.

Gears **23*a*, *b*, and *c* as well as sun gear 31 fit in recess 49, which is located in the under surface of lower manifold 13 and shown in FIG. 6*c***.

Actuator 40 with key 38 fits into groove 33 in the base of sun gear 31. As shown in U.S. Pat. No. 4,714,937, the valves can be rotated automatically to allow ink to flow into the bladders, or from the bladders to the printhead, or stop the flow entirely.

When the bladders are full of ink, dimpler impeller 39 is pushed against dimpler system 7 through hole 9. For this operation, valves 21 are in the reservoir-to-bladder mode, thus allowing excess ink return to the reservoirs. With the dimplers 35 still dimpling bladders 5, valves 21 are rotated to the bladder-to-printhead mode. The dimplers are then withdrawn, the printhead is primed and wiped as necessary, and the system is ready to print.

This system accommodates three colors; conventionally Cyan, Yellow and Magenta. As known in the prior art, a wide range of colors can be obtained by selective overprinting of these colors. The system also allows for a narrower and lighter pen, which will help in the fabrication of printers and plotters having a smaller footprint than otherwise attainable.

INDUSTRIAL APPLICABILITY

The tri-color ink delivery system of the invention is expected to find use in printers capable of providing full color printing.

Thus, there has been disclosed in some detail a tri-color ink delivery system, especially for printers. It will be readily apparent to one of ordinary skill in the art that several changes and modifications may be made without departing from the spirit and scope of the invention. For instance, the location of the valve, ink bag, bladder and printhead are not critical so long as they can cooperatively function as indicated herein. All such changes and modifications are deemed to fall within the scope of the invention, as defined by the appended claims.

What is claimed is:

1. A liquid delivery system for an ink-jet printer, said system having refillable bladders having in combination:

(a) multiple reservoirs for storing quantities of different liquids;

(b) a printhead capable of delivering separately each of said different liquids to a printing medium;

(c) a bladder for each of said different liquids for providing a supply of said liquid at a known back pressure to predetermined jets in a printhead;

(d) a valve associated with each bladder and an inlet means and an outlet means for providing a closed mode, a refill mode for conveying liquid from a reservoir to said bladder, and a print mode for conveying said liquid from said bladder to said printhead; and (e) support means for maintaining said reservoirs, said printhead, said bladders, and said valves in cooperative association.

2. A delivery system of claim 1 wherein said bladders are molded from elastomeric material.

3. A delivery system of claim 1 wherein said inlet means and said outlet means, are grooves cut into the under-surface of a top manifold.

4. A delivery system of claim 1 wherein the reservoirs contain inks of different colors.

5. A delivery system of claim 1 wherein the reservoirs contain inks of the same color but different optical densities.

6. A delivery system of claim 1 wherein the reservoirs contain different components that will react on the print medium to form an alphanumeric symbol or color.

7. A tricolor ink delivery system having refillable bladders, having in combination:

(a) three ink reservoirs for storing quantitites of different colored inks;

(b) a printhead capable of delivering inks of at least three different colors to a printing medium;

(c) three bladders for providing a supply of ink at a known back pressure of a selected color from each of said bladders to predetermined jets in a print head;

(d) a valve associated with each bladder for providing a closed mode, a refill mode for conveying ink from a reservoir to said bladder, and a print mode for conveying ink from said bladder to said printhead; and (e) support means for maintaining said reservoir, said printhead, said bladders and said valves in cooperative association.

8. A delivery system of claim 7 wherein said bladders are molded from elastomeric material.

9. A delivery system of claim 7 wherein said inlet means and said outlet means are grooves cut into the under-surface of a top manifold.

10. A delivery system of claim 7 wherein the reservoirs contain inks of different colors.

11. A delivery system of claim 7 wherein the reservoirs contain inks of the same color but different optical densities.

12. A delivery system of claim 7 wherein the reservoirs contain different components that will react on the print medium to form an alphanumeric symbol or color.

* * * * *